United States Patent [19]
Kaufmann, Jr.

[11] 3,851,470
[45] Dec. 3, 1974

[54] ANTI-POLLUTION EXHAUST CONVERSION SYSTEMS

[76] Inventor: John Kaufmann, Jr., 3716 Woodrow Ave., Pittsburgh, Pa. 15227

[22] Filed: Feb. 11, 1972

[21] Appl. No.: 225,644

[52] U.S. Cl.................. 60/298, 60/307, 60/317
[51] Int. Cl............................................ F02b 75/10
[58] Field of Search............ 60/298, 307, 308, 316, 60/317, 286

[56] References Cited
UNITED STATES PATENTS

| | | | |
|---|---|---|---|
| 2,880,079 | 3/1959 | Cornelius | 60/298 |
| 3,091,078 | 5/1963 | Dworak | 60/307 |
| 3,168,806 | 2/1965 | Calvert | 60/285 |
| 3,475,905 | 11/1969 | Wilford | 60/298 |
| 3,543,510 | 12/1970 | Kaufmann | 60/308 |
| 3,630,032 | 12/1971 | Grainger | 60/298 |
| 3,656,303 | 4/1972 | La Force | 60/274 |
| 3,665,711 | 5/1972 | Muroki | 60/298 |

Primary Examiner—Douglas Hart
Attorney, Agent, or Firm—Donn J. Smith

[57] ABSTRACT

An anti-pollution exhaust conversion system for an exhaust duct through which partially reacted exhaust gases are circulated comprises induction and mixing means mounted in the exhaust duct for inducting and mixing a reactant fluid with said exhaust gases, a collector coupled to the exhaust duct and to a source of the exhaust gases, and a variable insulator substantially surrounding the collector. The variable insulator has passage means extending therethrough for passage of a tempering fluid for varying the insulating characteristic of the insulator. Means are provided for supplying a reactant fluid to the induction and mixing means for induction thereby into the exhaust duct together with means for varying the rate of flow of the tempering fluid through the passage means of the variable insulator.

3 Claims, 12 Drawing Figures

PATENTED DEC 3 1974 3,851,470
SHEET 1 OF 3
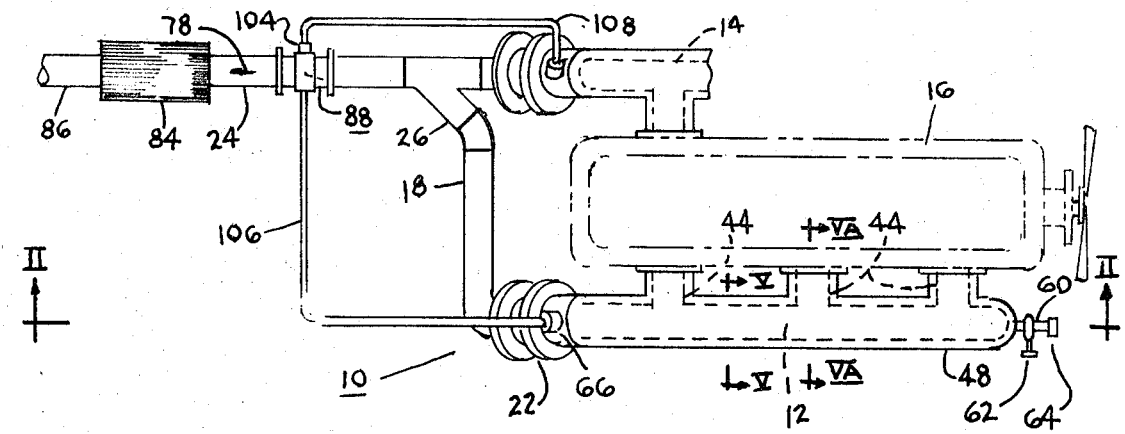
FIG 1
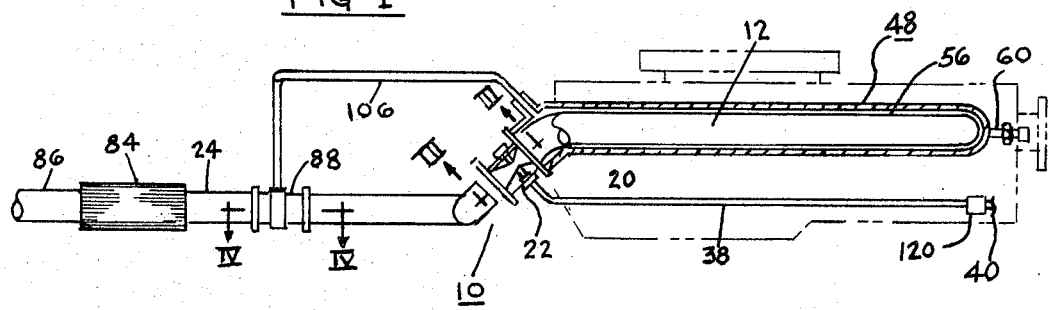
FIG 2
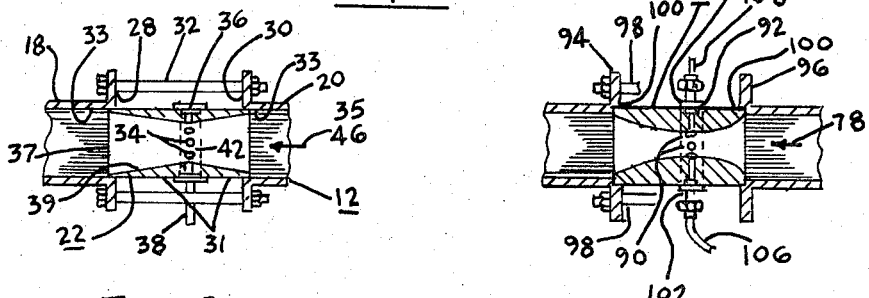
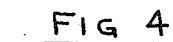
FIG 3  FIG 4
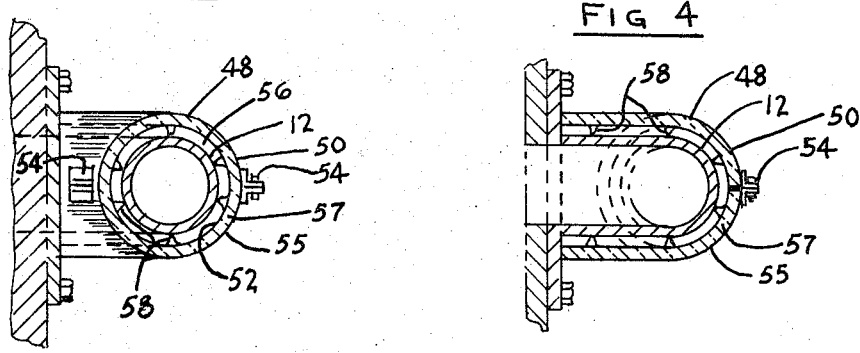
FIG 5  FIG 5A

ANTI-POLLUTION EXHAUST CONVERSION SYSTEMS

This application is an improvement upon certain aspects of my copending application entitled EXHAUST CONVERSION SYSTEMS filed Sept. 7, 1971 Ser. No. 178,201, now abandoned, which in turn is a continuation of my copending application entitled EXHAUST CONVERSION SYSTEMS filed Apr. 14, 1970, Ser. No. 28,406 now U.S. Pat. No. 3,657,878, which in turn was a continuation-in-part of my then copending application entitled EXHAUST CONVERSION SYSTEMS filed Aug. 23, 1968, Ser. No. 767,602 now U.S. Pat. No. 3,543,510.

The present invention relates to means for reducing or eliminating altogether the noxious gases emitted from the exhaust systems of various combustion operations, in particular internal combustion engines, in order to reduce air pollution resulting from their operation. More particularly, the invention relates to means of the character described for completing the combustion of internal combustion engine exhaust gases, irrespective of engine speed, in order to convert them to innocuous fluids.

Although my invention is described with primary reference to the exhaust system of internal combustion engines, it will become apparent as this description proceeds that the invention is not limited to this application. My exhaust conversion system is of general utility, and can be installed in a variety of exhaust systems handling products of incomplete combustion to oxidize potential air contaminants or in similar systems handling high temperature oxidizable or combustible gases. For example, it is contemplated that my conversion system or anti-pollution means can be installed in the exhausts of various types of reaction motors, industrial furnaces, and the like. The invention is capable of analogous applications, as in the induction of various types of reactant fluids other than combustion air. It is also contemplated that my novel venturi system can be used in conjunction with other exhaust and/or inductional systems, such as vacuum or jet pumps.

It is well known that the various hydrocarbon fuels employed in those engines generally classes as internal combustion engines are not completely combusted therein. This unavoidable, incomplete combustion of the fuels thus employed results in the generation of substantial quantities of unburned or partially burned hydrocarbons, carbon monoxide, nitrogen oxides, and other noxious waste gases which are usually vented to the atmosphere through the exhaust system. It is also well known that these noxious gases constitute a health hazard owing to their pollutional effects in the atmosphere. In recent years the health hazard has grown to dangerous proportions as a result of the rapidly increasing numbers of automobiles and other vehicles powered by internal combustion engines.

Many proposals have been advanced previously for combatting this health menace, most of which have attempted to burn, oxidize, or otherwise converted the exhaust gases either by thermal or catalytic conversional techniques. In the catalytic method, the exhaust gases leaving the engine are passed through a conversion unit in which the catalyst is suspended. Such units are rather bulky in construction and are therefore difficult to accommodate in most types of vehicles, where space is at a premium. Moreover, it is necessary to provide a carefully balanced supply of oxygen or the like and to maintain a particular heat balance. Catalytic converters therefore are difficult to maintain in proper adjustment even under ideal conditions and are virtually useless in the wide range of driving conditions encountered by the average vehicle.

In many of the thermal converting systems, an additional combustion chamber is required in the exhaust system of the engine. The combustion chamber is equally difficult to accommodate in the vehicle for the same reasons mentioned above in connection with the catalytic chamber. Many of these exhaust combustion chambers are provided in the form of afterburners which require additional fuel and an auxiliary ignition system, in addition to auxiliary combustion air, to accomplish the conversion of the exhaust fumes. The use of secondary fuel, of course, decreases the efficiency of the vehicle considerably, and in the event of failure of the ignition system or other malfunctioning in the afterburner, the noxious fumes from the engine exhaust are greatly increased by addition of the secondary fuel. Moreover, if either the catalytic converter or the thermal converter are placed under the hood of a conventionally constructed automobile, the danger to the vehicles' occupants is considerably increased in the event of malfunctioning of these converters.

It has also been proposed to conduct auxiliary combustion air from a blower or from a source of compressed air directly into the inlet ports of the exhaust manifold of an internal combustion engine. Such an arrangement, as typified by the U.S. Pat. to Dworak No. 3,091,078, would utilize the exhaust manifold or manifolds as exhaust combustion chambers. However, as the incoming exhaust streams through each of the exhaust manifold inlet ports is pulsating, as dictated by the engine's operating pattern, it is difficult, if not impossible, to maintain any sort of uniformity and continuity of combustion within the exhaust manifold. Whatever combustion does occur in the exhaust manifold is initiated at points very close to the exhaust valves of the engine with the result that these valves are rapidly burned. The resulting turbulence of these gases which are thus combusted, within the manifold moreover interferes with the proper flow of exhaust gases therethrough. As a result, it has been found necessary to employ some sort of catalytic or thermal conversion unit downstream of the exhaust manifold.

In general, none of the prior proposals for combustion or converting noxious exhaust fumes into innoccuous substances have been successful. In those known systems wherein a substantial conversion has been effected, the physical size of the equipment required to make the conversion as precluded their use with internal combustion engines employed in most automotive vehicles and other applications where space is at a premium.

In many of the previously proposed exhaust conversion system, auxiliary combustion air has been inducted into the exhaust system by jet aspirators or by improperly shaped and improperly located venturi aspirators or the like. These devices provide an uncertain supply of auxiliary combustion air at best, and under certain conditions for example when the engine is idling or nearly so, the flow through the jet or venturi aspirator is reversed so that noxious exhaust fumes are emitted prematurely from the exhaust system, i.e. at a location where the fumes can enter the cab or passenger compartment of the vehicle resulting in a hazard to the occupants thereof. Examples of such prior proposals are the U.S. Pat. Nos. to Knopp 3,300,964, Tietig 2,005,249, Cornelius 2,953,898, Ennarino et al 3,285,709, and Barnes 3,032,969. Such prior proposals are Harger 2,071,119, Briggs et al 3,473,323, and Houdry 3,045,422 require use of catalysts. In particular, the induction apertures of none of these proposals are located for optimum mixing or shaped for a jetting action to promote mixing of exhaust with the inducted combustion air or other reactant. The Barnes arrangement requires a venturi at each exhaust port of the engine, which would tend to overheat the valves.

My researches in this field indicate that these prior devices would not function properly at all engine speeds (or flow rates of the exhaust gases) owing to the shape of their venturi structures, the location of the intake apertures, and their improper control or lack of control over temperature ranges of the exhaust gases. As described more fully below, to complete the combustion of the exhaust gases requires a careful addition and distribution of combustion air or other reactant fluid into the exhaust duct, together with some means for controlling the overall temperature levels of the exhaust gases and relating such control to variations in engine speeds or otherwise to variations in flow rate of the exhaust gases.

Crank case scavenging arrangements utilizing the venturi principle are shown in Phillips 2,585,495 and Griswold 1,766,900. The Phillips device would appear to add to atmospheric pollution, as apparently there is no attempt to oxidize the exhaust and crank case gases.

Other exhaust handling systems are shown in the U.S. Pat. to Cornelius Nos. 2,677,231 and 2,851,852 and in Bowen III et al 2,772,147. In the Cornelius Patents the several illustrated venturi structures provide minimal flow area and considerable obstruction to the passage of the exhaust gases therethrough. Rather large and complicated structures are entailed for this reason. The Bowen venturi arrangement does not provide adequate induction and mixing of combustion air to solve the problems confronted by the present invention. The Bowen structure further incorporates a catalytic conversion unit downstream of the mixing venturi.

I am also aware of a number of venturi pump and mixer structures as exemplified by the U.S. Pat. Nos. to Phillips 2,711,284 and Campbell 2,493,387, and French Pat. No. 233,502 to Mr. Languilharre. These structures likewise fail to provide the requisite induction and mixing action, and attendant jetting and tempering actions of my novel exhaust conversion structures.

None of the prior art discloses suitably disposed and structured induction and mixing means for mixing combustion air or other reactant fluid with the exhaust gases, in combination with means for controlling the temperature of the exhaust gases and/or with means for variably preheating the reactant fluid for enhancing combustion or other conversion of the exhaust gases to innocuous products.

I overcome these deficiences of the prior art by providing a simple yet reliable conversion or anti-pollution system for exhaust gases, which requires little or no additional space in the vehicle exhaust gas system or in other exhaust systems where space is at a premium. The conversion system includes means for inducting auxiliary combustion air or other reactant fluid into the exhaust system at a point where the heat of the exhaust gases is sufficient to initiate and to drive the combustion of the exhaust fumes substantially to completion. In the case of automotive vehicles, I have determined that the most advantageous point of entry for the auxiliary combustion air is adjacent the outlet of the one or more exhaust manifolds of the vehicle engine. At this point the exhaust stream is relatively steady, in contrast to the pulsating streams of the engine block exhaust ports.

More particularly I provide variable insulating means associated with the exhaust manifold or other collector of exhaust gas temperatures within the manifold or collector. In a preferred modification of the invention additional means are associated with the variable insulating means for varying the average temperature of the exhaust gases within the manifold collector in dependence upon the rate of flow of the exhaust gases therethrough. In automotive applications, the insulating characteristic of the variable insulating means can be conveniently related to the speed of the automotive vehicle or to the rpm developed by its engine. In general the temperature varying means associated with the exhaust manifold or other collector can be a system of varying thermal insulation. For example, the thermal insulating capability of the system desirably can be relatively high at idling speeds of an automotive engine (when exhaust gas flow rates are low) and low or nonexistent at highway speeds (high exhaust gas flow rates).

An appropriate temperature level is thereby maintained under all operating conditions of the automotive vehicle (or other source of exhaust gases) to initiate and to sustain the combustion of the exhaust gases by my conversion system, in the most efficient manner. Accordingly, problems sometimes attendant with low exhaust gas flow rates, as when a vehicle engine is idling or the vehicle is in slow moving traffic, are obviated. Thus, my anti-pollution means are rendered most efficient and effective in areas of high traffic concentration, where air pollution problems are most severe.

The efficiency of my exhaust conversion system is further enhanced by a particular location of the reactant fluid induction apertures relative to particular venturi shapes and throat structures. In other applications of my invention, I have found that combustion of the exhaust gases is made even more efficient by preheating of the reactant fluid, as by inducting the same through the aforementioned variable insulating means in order to modify the insulating characteristic thereof in a controlled manner.

The several modifications of my exhaust conversion systems involve no moving parts with the result that the possibilities of malfunctioning of the system are almost nil. Finally and most importantly, my novel exhaust conversion systems require little or no modification of existing exhaust duct work such that my system can be installed on existing as well as newly manufactured vehicular exhausts or on other exhaust systems.

I accomplish these desirable results by providing an anti-pollution exhaust conversion system for an exhaust duct through which partially reacted exhaust gases are circulated, said system comprising induction and mixing means mounted in the exhaust duct for inducting and mixing a reactant fluid with said exhaust gases, a collector coupled to said exhaust duct and to a source of said gases, a variable insulator substantially surrounding said collector, said variable insulator having passage means extending therethrough for passage of a tempering fluid for varying the insulating characteristic of said variable insulator, and means for supplying a reactant fluid to said induction and mixing means for induction thereby into said exhaust duct, and means for varying the rate of flow of said tempering fluid through said variable insulator passage means.

I also desirably provide a similar exhaust conversion system wherein said source is an internal combustion engine, and means are provided for coupling said tempering fluid varying means to an output shaft of said engine so that the flow rate of said tempering fluid through said insulator passage means is varied directly with the speed of said engine.

I also desirably provide a similar exhaust conversion system wherein said source is an internal combustion engine, and said engine and said exhaust duct are mounted in an automotive vehicle, said tempering fluid varying means include a conduit coupling said insulator passage means to a slip stream of said vehicle produced by motion thereof so that the rate of flow of said tempering fluid through said insulator passage means is varied with the speed of said vehicle.

I also desirably provide a similar exhaust conversion system wherein said tempering fluid varying means include means for coupling said insulator passage means to said induction and mixing means so that the flow of tempering fluid through said passage means is varied directly with the rate of flow of said exhaust gases through said exhaust duct.

I also desirably provide a similar exhaust conversion system wherein said induction and mixing means include a venturi member mounted in said exhaust duct adjacent the outlet of said collector, conduit means coupling an adjacent end of said passage means to said venturi member, additional flow means coupling a remote end of said passage means to a source of said reactant fluid so that said reactant fluid is drawn through said passage means as tempering fluid therefor whereupon said reactant fluid is preheated.

I also desirably provide a similar exhaust conversion system wherein said source is an internal combustion engine for an automotive vehicle, said induction and mixing means include a first venturi mounted in said exhaust duct for inducting and mixing said reactant fluid with said exhaust gases, and a second venturi member mounted in said exhaust duct and coupled to said passage means for drawing said tempering fluid therethrough in proportion to the rate of flow of said exhaust gases through said second venturi.

I also desirably provide a similar exhaust conversion system wherein said variable insulator includes an insulating shell substantially surrounding said collector and spaced therefrom to define said tempering passage means, said collector and said shell being elongated, an inlet member secured adjacent one end of said shell in communication with said passage means, an outlet member secured adjacent the other end of said shell and communicating with said passage means, flow-restricting means coupled to at least one of said inlet and outlet members, at least one of said inlet and outlet members being coupled to said tempering fluid flow-varying means.

During the foregoing discussion various objects, features and advantages of the invention have been alluded to. These and other objects, features and advantages of the invention together with structural details thereof will be elaborated upon during the forthcoming description of certain presently preferred embodiments of the invention together with presently preferred methods of practicing the same.

In the accompanying drawings I have shown certain presently preferred embodiments of the invention and have illustrated certain presently preferred methods of practicing the same in which:

FIG. 1 is a top plan view of one form of automotive exhaust system arranged in accordance with the invention;

FIGS. 1A and B are similar views of automotive exhaust systems modified in accord with the invention;

FIG. 2 is a side elevation, partially in section of the exhaust system shown in FIG. 1 and taken along reference line II—II thereof;

FIG. 3 is an enlarged partial longitudinally sectioned view of the apparatus as shown in FIG. 2 and taken along reference line III—III thereof;

FIG. 4 is a similar view of the apparatus as shown in FIG. 2 but taken along reference line IV—IV thereof;

FIG. 5 is an enlarged partial cross-sectional view of the apparatus as shown in FIG. 1 and taken along reference line V—V thereof;

FIG. 5A is a similar view but taken along reference line VA—VA thereof;

Figure 1A:
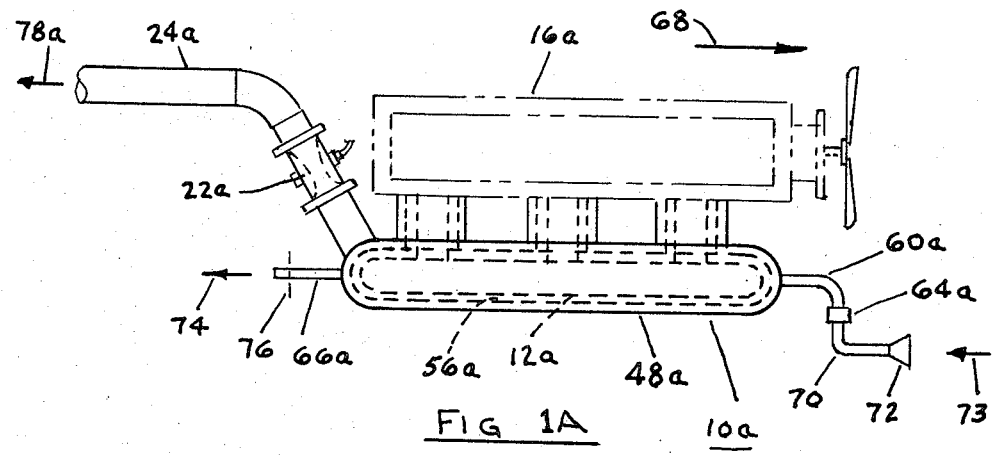
FIG. 1C is a sectional view of still another modification of the exhaust system.

With reference now initially to FIGS. 1 through 5A of the drawings, the exemplary exhaust conversion system 10 shown therein is incorporated with exhaust gas collectors, e.g. exhaust manifolds 12, 14 of an automotive engine 16. Depending upon the structure of a given automotive engine, such engine can employ a single exhaust manifold, for example the manifold 14. In such case the manifold 12 and cross over pipe 18 and associated components would be omitted. In the illustrated embodiment each manifold 12 or 14 includes an angularly disposed flanged outlet port 20 to which is directly connected an exhaust conversion venturi structure 22. The venturi 22, as better shown in FIG. 3, is mounted directly between the exhaust manifold 12 and 14 and the adjacent portion of fore pipe 24 or of the aforementioned cross over pipe 18, which is adjoined to the fore pipe 24 by means of wye fitting 26.

In furtherance of this purpose the fore pipe or cross over pipe 18 or 24 is provided with a flanged end 28. Series of apertures are provided in the flange 28 and in the manifold flange 30 to receive a number of tie bolts 32.

The conversion venturi 22 is provided with a series of induction apertures 34 which communicate with a venturi manifold arrangement 36 and inlet conduit 38. Desirably the inlet conduit 38 is disposed such that access is had to clean combustion air or other reactant fluid as by inserting outer end 40 thereof into the slip stream of the vehicle (not shown) when in motion. This arrangement facilitates induction of combustion air, particularly when the vehicle is caught in slow moving traffic and the rate of flow of exhaust gases through the exhaust duct 18, 24 is relatively low.

The induction and mixing venturi 22 can be fabricated after the manner described and claimed in my U.S. Pat. No. 3,543,510 or in either of my copending applications Ser. Nos. 28,406 and 178,201. A particular desirable configuration of the venturi 22 is that shown in FIG. 7 of my latter copending application filed Sept. 7, 1971, Ser. No. 178,201, wherein induction and mixing of the incoming air is facilitated by use of throat ridge 42 which intersects the inward ends of the venturi apertures 34.

Location of the combustion venturi 22 at the exit port 20 of the exhaust manifold 12 or 14 exposes the combustion venturi 22 to the highest practical temperature of the exhaust gases. Of course, the conversion venturi 22 could be located inside the manifold 12 or 14, but this would entail specialized problems of manufacture and maintenance. Moreover, it is likely that the venturi would be exposed to pulsating flows of exhaust gases, which would interfer with proper mixing of the inducted air and the exhaust gases. A somewhat higher temperature would be encountered, if a number of exhaust conversion venturi were placed in the exhaust manifold inlet ports 44. In such case, the conversion venturi's would be exposed to even greater flow pulsations, not to mention unnecessary duplication of venturis and specialized mountings therefore on the engine block 16 and/or the exhaust manifold inlets 44.

The outer surfaces of the conversion venturi 22 can be tapered or expanded toward the venturi manifold 36, in the area denoted by reference character 31. It is desirable to provide a tight and substantially rigid engagement between the ends of the venturi 22 and the fore pipe 18, 24 and manifold outlet 20 respesctively (FIG. 3). For this purpose the tapered surfaces 31 are milled or otherwise finished, as are the adjacent inner surfaces 33 of the fore pipe 18 and the manifold port 20 to provide a sealing engagement against escape of the exhaust gases passing therethrough. The tie bolts 32 can be tightened sufficiently to provide such engagement. Alternatively, the conversion venturi 22 can be provided with shouldered portions (not shown in FIG. 3) after the manner of FIG. 4 described below.

Desirably, the induction apertures 34 are provided with a length to diameter ratio of between 3 to 1 and 5 to 1 to impart a jetting action to the inducted air. Such jetting action as evident from FIG. 3 is directed transversely of the flow of exhaust gases (arrow 46) to facilitate mixing of these gases. Mixing is further enhanced by imparting a predetermined degree of turbulence to the exhaust gases by means of a blunt or truncated leading edge 35 of the conversion venturi 22. For the same purpose the throat ridge 42 and the induction apertures 34 are located closer to the leading edge 35 of the venturi 22 then to the trailing edge 37 thereof. For optimum performance of the venturi 22 the inner venturi surfaces 39, 41 occlude an angle of about 125° to about 155° at the throat ridge 42. A throat ridge angle substantially below the stated range will impair the induction and mixing characteristics of the venturi 22, while a throat ridge angle substantially above this range will impede the flow of exhaust gases through the venturi 22 and will interfer with proper mixing of exhaust gases and inducted reactant at the venturi 22. Further, the selection of a throat ridge angle substantially outside of this range will establish a less than optimum ratio of combustion air and exhaust gases.

Desirably the leading venturi surface 41 is disposed at a somewhat greater angle to the long axis of the venturi 22 than is the trailing venturi surface 39. The transverse thickness of the venturi 22 in the area of the throat ridge 42 and inductional apertures 34 is sufficient to provide the aforementioned length to diameter ratio when apertures 34 of an adequate flow diameter are employed. A greater or lesser number of the apertures 34 can be employed relative to the numbers shown in FIG. 3 and depending upon the desired optimum flow of the inducted combustion air or other reactant.

As mentioned previously, my exhaust conversion system can be employed in exhaust ducts coupled to apparatus other than that shown herein, for example in various types of furnace and oven ducts and in connection with other process equipment. It is contemplated further that the exhaust gases need not be partially combustible in the ordinary sense of the term. Rather, the exhaust gases can be partially reacted in the general or chemical sense and a reactant fluid can be inducted as described, which may be ambient air, oxygen, or some other fluid reactant capable of converting the exhaust gases into non-toxic or inoccuous effluents.

In the region of the combustion or conversion venturi 22 the pulsating inlet exhaust streams through the manifold inlets 44 have been converted into a substantially steady flow of effluents, as denoted by flow arrow 46. The usual cast iron structure of exhaust manifold 12 or 14 minimizes the temperature drop between the exhaust manifold inlet ports and the outlet manifold ports 20. Accordingly, as intimated above, I have determined that the optimum location of the conversion venturi 22 is as close to the manifold 20 as is structurally feasible. However, at idling engine speeds and at slow moving traffic speeds of the vehicle, too much of the sensible heat of the exhaust gases is dissipated by the exhaust manifold or manifolds for operation of the exhaust conversion system at optimum efficiency. The present invention provides means for varyingly insulating the exhaust manifold or collector so as to provide higher temperature exhaust gases at idling or near idling engine speeds and lower or normal exhaust gas temperatures at highway speeds. Preferably, the variable manifold insulator has an insulating characteristic which varies more or less directly with the speed of the automotive vehicle, the engine rpm, or the rate of flow of exhaust gases through the duct 18, 24.

By the same token, the efficiency of the exhaust conversion system can be optimized by a variable heating of the combustion air before it is inducted into the conversion venturi. This can be done separately or in conjunction with the aforementioned variable insulating provided for the exhaust manifold or manifolds. Accordingly, the exhaust conversion system 10 is self-adjusting to varying compositions of exhaust gases, and differing temperatures and flow rates thereof as occasioned by differing engine loadings, e.g. under conditions of normal vehicle cruising and acceleration, engine idling, slow traffic, deceleration, and heavy acceleration. The temperature of the exhaust gases, together with the temperature of the inducted combustion air in one arrangement of the invention, is self-adjusted by the exhaust conversion system to compensate these varying conditions.

Figure 1B:
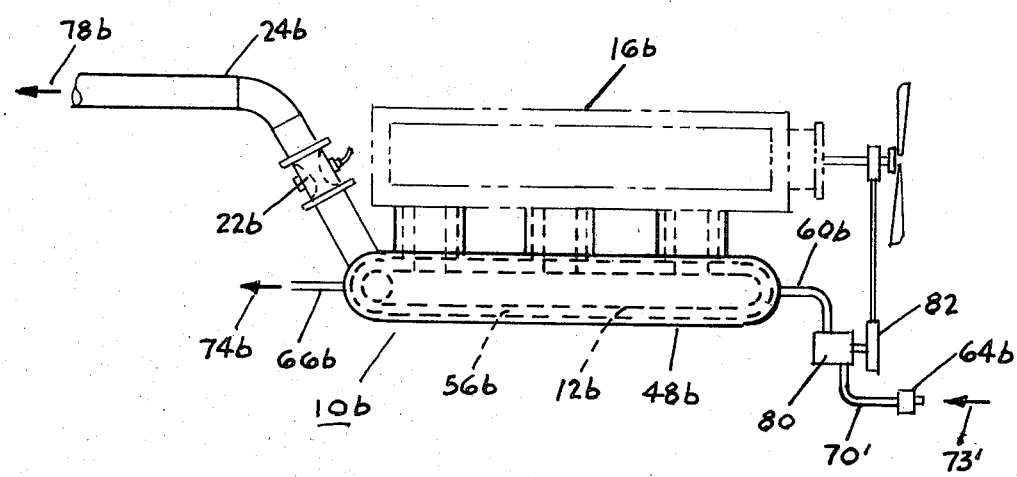
Figure 1C:
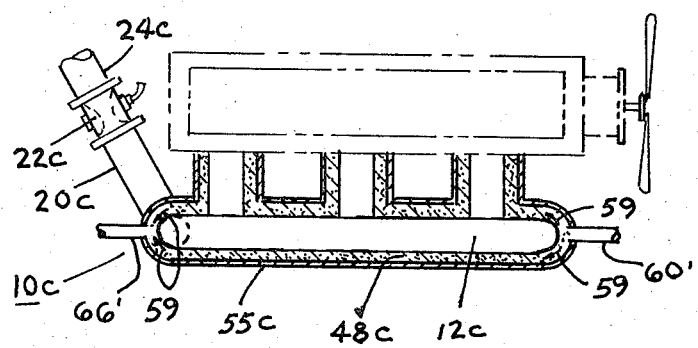

One form of such variable insulation means is designated by the reference character 48 in FIGS. 1, 2, 5 of the drawings. Each variable insulator 48 in this example include a pair of insulating half sections 50, 52 which are shaped complementarily for substantially completely enclosing the associated exhaust manifold 12 or 14. Desirably the insulating sections 50, 52 are fabricated from a relatively rigid, high temperature insulation so as to be serviceable throughout the life of the vehicle or related duct work on which the exhaust conversion system is utilized. Each of the insulating sections 50, 52 can be provided with securance straps or brackets 54 embedded therein or otherwise secured thereon for suitably fastening the insulating sections 50, 52 about the manifold 12. It is also contemplated that the insulating material comprising the insulating sections 50, 52 can can be protected with an outside backing or outer covering 55 (FIG. 5) to which the brackets 54 or other suitable fastening means can be secured. The backing 55, if used, can be formed from reinforced asbestos or fiberglass or other structural material. The insulating material 57 desirably is a rigid material such as foamed glass or other high temperature insulating material, a honeycomb structure, or a porous insulating material such as glass or asbestos wool shaped and confined by the backing member 55. In the latter case, as shown in FIG. 1C the porous insulation material can be confined against the outer surfaces of the manifolds such as manifold 12c, and the passages 56 (FIGS. 5, 5A) eliminated. The insulating characteristic of the insulation material is then variably impaired by drawing variable quantities of tempering air or other fluid directly through the porous insulation (arrows 59) as confined between the manifold 12c and the impervious backing members 55c. The variable insulator 48c of the latter form of the exhaust conversion system otherwise functions in the same manner as the FIGS. 1–5A embodiment. As better shown in FIGS. 5 and 5A the insulating sections 50, 52 can be provided with openings through which the manifold inlets 44 and outlets 20 are extended to facilitate mounting of the insulating sections 50, 52. The openings in the insulating sections 50, 52 for the inlet and outlet manifold port can be sized such that the insulating half sections 50, 52 are closely fitted to the manifold at these locations to prevent the leakage of ambient air into the annular space 56.

The insulating sections 50, 52 are shaped such that, when adjoined as shown in FIG. 5, passage means such as annular space 56 is maintained between the inner surfaces of the insulating sections 50, 52 and the outer surfaces of the exhaust manifold 12 or 14. Each of the insulating sections desirably is provided with a number of radially and inwardly extending projections 58, sized to maintain a uniform spacing 56 between the manifold 12 or 14 and the variable insulating means 48. If desired the junctions between the insulator openings and the manifold inlet and outlet ports can be sealed with a suitable high temperature cement.

Communicating with the front end portion of the annular space or passage means 56 is an inlet conduit 60. The conduit 60 can be secured to one or the other of the insulating sections 50, 52 or alternatively can be enclosed and secured at the junction therebetween. When thus mounted, the inlet conduit 60 provides a controlled communication of the annular insulating space 56 with the ambient, in which case the tempering fluid for the insulator 48 is ambient air. Desirably, the inlet port 60 of the insulator structure 48 is provided with a valve 62 or other adjustable orifice in order to regulate the flow capability through the insulator inlet 60. Seasonal or other adjustments can thereby be imparted to the variable insulating arrangement 48 by suitable adjustment of the valve 62 or the like. Alternatively the valve or adjustable orifice 62 can be replaced with a thermostatically controlled orifice so that the area of the orifice can be related automatically to the ambient temperature. A suitably sized opening in one or both of the insulating sections 50 can also serve as an inlet for the annular space 56, in which case a discrete conduit such as the conduit 60 would be omitted.

The purpose of the insulator inlet 60 is to admit a limited flow of ambient air or other tempering fluid into the normally insulating space 56 between the manifold 12 or 14 and the insulating half sections 50, 52. Such limited flow, which can be varied as described hereinafter, affords a calculated impairment of the insulating capability of the variable insulator 48. The inlet port 60 imposes an upper limit on air drawn through the insulating air space 56 such that the insulating capability of the arrangement 48 cannot be impaired by more than a predetermined extent. More particularly, the limited flow characteristic of the inlet port 60 prevents free access of ambient air to the insulating air space 56, when it is desired to draw little or no ambient air through the insulating space 56, as when the engine 16 is idling or the related vehicle is caught in stop-and-go or very slow moving traffic.

It should be understood, of course, that it is not essential to relate the flow capability of the insulator inlet port 60 precisely to ambient temperature, although the performance of the variable insulator 48 in relation to the vehicle exhaust conversion system 10 is somewhat improved thereby. This follows from the principle of operation of the insulating means 48 in that very little air or other tempering fluid is drawn through the insulating air space 56 at low engine rpms. In consequence, when insulation of the manifold 12 or 14 is needed most, there is very little impairment of the insulating capability of the variable insulator 48. As noted above, combustion or other conversion of the exhaust gases is enhanced by increasing the temperature of the gases. The exhaust gas temperature is effectively increased by minimizing heat loss at the manifolds 12, 14. The insulating characteristic of the variable insulator 48 approaches the maximum at slow engine speeds or at low vehicle speeds or whenever the exhaust gas flow rate is quite low, by similarly minimizing the rate of flow of tempering air or other fluid through the insulating space 56. As the rate of flow of exhaust gases increases, the insulating characteristic desirably is progressively worsened to prevent the exhaust manifolds 12, 14 from overheating.

To prevent the entry of dirt and other foreign material the inlet port 60 can be provided with a conventional air filter 64 which is located outwardly of the valve or adjustable orifice 62, if used. Cooperating with the inlet ports 60 of the variable insulators 48, in the respect of a variable flow of ambient air through the insulating air spaces 56, are outlet ports 66 mounted generally at the other or rear ends of the insulators 48. Each outlet insulator port 66 likewise communicates with the associated annular air space 56 and can be mounted on the insulating means 48 in a manner similar to that described above in connection with inlet port 60. It is desired that the variable insulating characteristic of the variable insulators 48 be related to the speed of the vehicle or more preferably to the rpm or speed of the engine 16. Most preferably, the variation in insulating characteristic is related directly to the flow rate of the exhaust gases through the engine exhaust system including of course the manifolds 12, 14 and the fore pipe 24. Accordingly a number of means can be utilized for varying the flow of ambient air through the insulating space 56 of the variable insulator 48 in accordance with one or more of these parameters (viz. vehicle speed, rpm, or flow rate of the exhaust gases).

For example the amount of ambient air drawn through the insulating capability of the variable insulator 48, can be related to the speed of the vehicle (not shown) in the manner disclosed in FIG. 1A. In describing FIG. 1A it will be assumed that a vehicle (not shown) in which engine 16a is mounted is moving in the direction indicated by arrow 68. The engine 16a can be provided with a single exhaust manifold 12a, or with a pair of exhaust manifolds (not shown) after the manner of FIG. 1 depending upon the specific conventional structure of the engine. In the arrangement of FIG. 1A the outlet port 66a of the variable manifold insulator 48a is open to the ambient as shown. The inlet port 60a, however, is connected through filter 64a and conduit 70 to the air scoop 72. Preferably, the air scoop 72 is located on the vehicle so as to be disposed in the slip stream thereof.

The amount of air inducted by the air scoop 72 and flowing therefrom to the insulating space 56a will be closely dependent upon the speed of the vehicle. Thus, at slow vehicle speeds, or when the vehicle is not in motion with the engine idling, little or no air is drawn through the insulating space 56 a. The temperature of the exhaust manifold 12a therefore increases (in inverse proportion to the amount of air flowing through the insulating space 56a) to render the conversation venturi 22a proportionately more efficient at engine idling or low vehicle speed conditions, as a result of higher exhaust gas temperatures. On the other hand at higher vehicle speed or at normal highway speeds, proportionately more air is drawn through the insulating space 56a and emitted therefrom through the outlet port 66a (arrow 74) to prevent the exhaust manifold 12a from overheating. The maximum amount of inducted air through the insulating space 56a can be limited if desired by means of orifice 76 in the insulator outlet port 66a. The orifice 76 can be made adjustable as described above in connection with the adjustable orifice 62 in the inlet port 60 of FIG. 1. Alternatively, a similar orificing means can be used in the inlet port 60a after the manner of FIG. 1.

The arrangement of FIG. 1A is advantageous in that little or no moving parts are employed. A possible disadvantage resides in the fact that the flow of air through the variable insulator 48a (arrows 73, 74) is not directly related either to the engine rpm or to the rate of flow of the exhaust gases (arrow 78a). There is the possibility, therefore, that the engine 16a could be run at a faster than normal idling rpm for an extended period while the vehicle is motionless, with the result that the manifold 12a can be overheated.

Therefore, in the modification of the invention as illustrated in FIG. 1B the flow of ambient air (arrow 73', 74') through the insulating space 56b of the manifold insulator 48b is related directly to the rpm of the engine 16b. The insulator inlet port 60b is coupled to a low volume pump or blower 80 which is driven directly from the engine as shown. The inlet of the pump 80 is coupled to the ambient or other source of tempering fluid through conduit 70' and air filter 64b. If necessary, a suitable speed reducer (not shown) can be coupled between the pump or blower pulley 82 and the pump or blower 80. Desirably the size, speed and volume capabilities of the pump or blower 80 are selected such that very little air is pumped or blown through the insulating space 56a at the idling or slowest speed of the engine 16b. Accordingly, the manifold 12b operates at proportionately higher temperatures at idling or other relatively slow speeds of the engine 16b and at or near the normal manifold temperatures at the highest engine speeds. As noted previously by thus increasing the temperature of the exhaust gases (arrow 78b) at idling or lower engine speeds, the exhaust gases are thoroughly combusted or reacted in the region of the converstion venturi 22b, which might not otherwise be the case. Like the arrangement of FIG. 1A, the modification of FIG. 1B is satisfactory for many applications of the invention. However, the FIG. 1B modification does involve moving parts, and the flow of ambient air through the insulating space 56b and hence the temperature of the manifold 12b is not directly related to the flow of exhaust gases through the exhaust duct 24b. That is to say, a flow variation of exhaust gases may occur at the same relative engine speeds, depending upon engine loadings.

With reference again to FIG. 1 of the drawings, the exhaust conversion means 10 is arranged in this modification such that the insulating characteristic of the variable insulator 48 is related directly to the flow of exhaust gases (arrows 78) through the exhaust duct 24. FIG. 1 shows an engine 16 having dual cylinder banks and manifolds 12, 14 but a single muffler 84 and tail pipe 86. To relate the flow of ambient air through the insulating spaces 56 of each of the manifolds 12, 14 to the flow of exhaust gases (arrows 78) suitable pumping means are provided which are activated by the flow of exhaust gases. Preferably, suction or aspirator means for this purpose are mounted in the exhaust duct 24 and are located downstream of the cross over pipe 18 and wye fitting 26, such that the suction means are subjected to the full flow of exhaust gases from both of the manifolds 12, 14.

One arrangement of such pumping or suction means includes venturi 88 (FIG. 4) mounted in the exhaust duct 24 downstream of the wye fitting 26 but preferably upstream of the muffler 84. The design of the variable insulator venturi 88 is not critical as that of the conversion venturi 22 as little or no mixing and combustion of exhaust gases need not take place thereat. Owing to the efficiency of the exhaust conversion system 10 substantially all of the conbustable exhaust gases have been burned in the region of the conversion venturi 22, as described previously. Of course, where it is anticipated that some such combustion may take place adjacent the variable insulator venturi 88, a venturi similar to that shown in FIG. 3 can be utilized. Desirably however, the venturi 88 is designed for a maximum induction of ambient air or other tempering fluid (through the insulating spaces 56 as aforesaid) relative to the flow of exhaust gases therethrough. Thus, adequate cooling of the manifolds 12, 14 by flow of air through the variable insulators 48 is available when need, e.g. at the higher engine speeds. As in the case of the conversion venturi 22, the venturi 88 is provided with a number of induction apertures 90 and a suitable manifolding arrangement 92. The venturi 88 can be mounted in the fore pipe 24 which can be provided in the form of sections having flanges 94, 96 respectively. An appropriate number of tie bolts 98 can be extended through the flanges 94, 96 to tighten the flanges against shoulder portions 100 formed on the outer surfaces of the variable insulator venturi 88. The shouldered portions 100 and the adjacent surfaces of the flanges 94, 96 can be machined for a sealing engagement against escape of the exhaust gases.

In the arrangement as shown in FIGS. 1 and 4, the manifold 92 of the variable insulator venturi 88 is provided with a pair of inlet ports 102, 104 both of which communicate with the interior of the manifold 92 and venturi apertures 90. Each of the fittings 102, 104 is coupled through conduit 106 or 108 to the outlet port 66 of the associated manifold insulator 48. Thus, the flow of the exhaust gases through the variable insulator venturi 88 draws ambient air through each of the manifold insulators 48 in direct proportion to the rate of flow of exhaust gases through the fore pipe 24. At engine idle speeds little or no air is drawn through the insulating spaces 56 of the variable insulators 48 such that the insulators 48 conserve virtually all of the heat within the exhaust gases. Accordingly these exhaust gases exit from the manifold 12, 14 substantially at engine combustion chamber temperatures and pass directly into the conversion venturi 22. A more efficient combustion of the exhaust gases therefore results.

Such efficiency is enhanced by the greater flow rates of the manifold exhaust gases owing to the necessarily higher temperatures thereof at idling and at low engine speeds. Depending upon size and type of engine, the manifold temperature at idling speeds may be increased from about 400° F to temperatures approaching 1,000° F. Accordingly, a larger quantity of combustion air is inducted by the conversion venturi 22 then would otherwise be the case in the absence of the manifold insulators 48. At higher exhaust gas flow rates increasing quantities of ambient air are drawn through the insulating spaces 56 (FIG. 5) to prevent overheating of the engine manifold 12, 14. Alternatively, and after the manner of FIG. 6, a pair of variable insulator venturis (not shown in FIG. 1) can be mounted respectively in the cross over pipe and in that portion of the fore pipe 24 upstream of the wye fitting 26 so that the insulation characteristic of each variable insulator 48 can be related directly to the quantity of exhaust gases issuing from its associated manifold 12 or 14.

Figure 6:
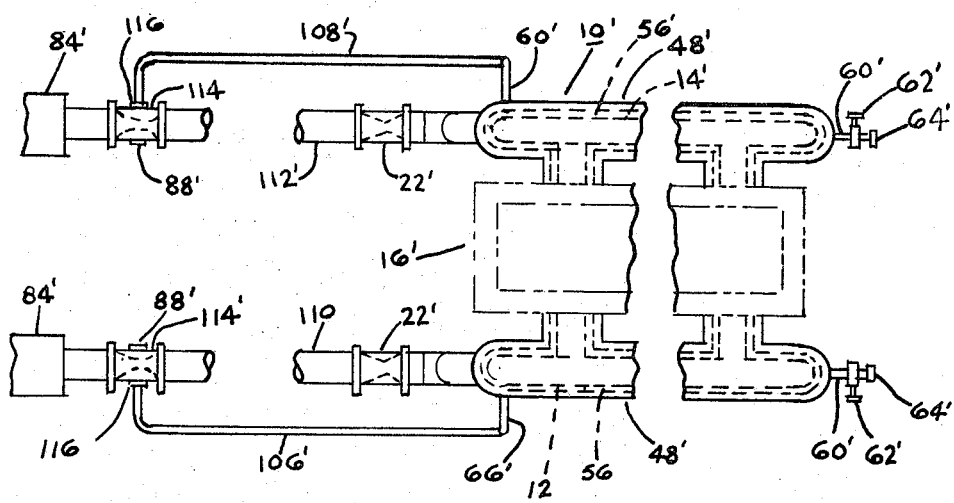
FIG. 6 is a top plan view of another form of the exhaust conversion system arranged in accordance with the invention.

In the modification of the exhaust conversion system 10' shown in FIG. 6, the system 10' is arranged for use with a conventional "dual exhaust" configuration. In this arrangement the engine 16' is provided with two banks of cylindes with separate exhaust manifolds 12', 14', as in the case of FIG. 1 and related figures. However, the manifolds 12', 14' are connected individually to fore pipes 110, 112 in which are located individual conversion venturis 22' and a pair of conventional mufflers 84'. A separate variable insulator venturi 88' is disposed in each of the fore pipes 110, 112 at locations upstream of the mufflers 84'. Each of the variable insulator venturis 88' is provided with a manifold structure 114 having a single inlet port 116 which is coupled to the associated variable insulator conduit 106' or 108'. The operation of the exhaust conversion system 10' is similar to that of the system 10 described above in connection with FIGS. 1-5A of the drawings, except that the flow of air through the insulating air spaces of the variable insulators 48' is related directly to the rate of exhaust gas flow from only that manifold 12' or 14' associated therewith.

Figure 7:
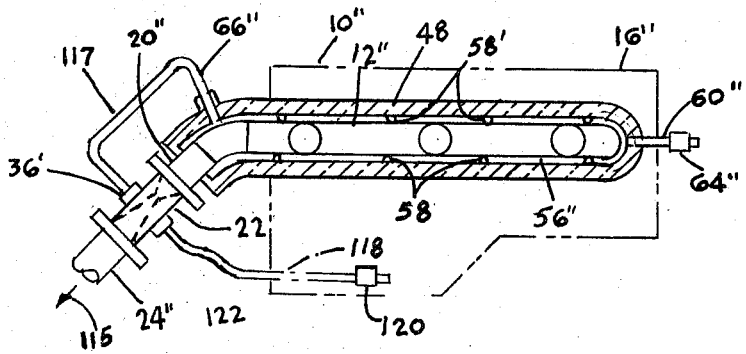
FIG. 7 is a side elevational view, partly in section, of still another form of the exhaust conversion system.

In the exhaust conversion system 10" of FIG. 7, a unique arrangement is provided for a variable preheating of the combustion air or other reactant for the exhaust gases in addition to a variable temperature level of the exhaust gases themselves. The engine 16" or other source of exhaust gases can be provided with a single or multiple exhaust manifold structure, represented in FIG. 7 by the single exhaust manifold 12". The manifold 12" is provided with a variable insulating arrangement 48" after the manner described previously including the provision of inlet and outlet ports 60" and 66" respectively. If desired the inlet port 60" can be provided with air filter 64".

The variable insulator outlet 66" is coupled in this example directly to the manifold 36' of the conversion venturi 22". The conversion venturi 22" preferably is fabricated and located after the manner of FIGS. 1-3. In the exhaust conversion system 10" of FIG. 7 a separate aspirator venturi, such as the venturi 88 of FIGS. 1, 2 and 4 for the variable manifold insulator 48" is therefore obviated. Instead, the conversion venturi 22" (FIG. 7) serves the multiple functions of induction of tempering air or other fluid through the variable manifold insulator 48", induction of combustion air or other reactant directly into the exhaust duct, and mixing of the combustion air with the exhaust gases passing through the duct (arrow 115).

In order to afford a relatively low resistance flow of combustion and tempering air through the air space 56", desirably the flow restriction means 62 of FIG. 1 is omitted from the variable insulator inlet port 60". A larger such port 60" can be substituted in comparison with that used in the preceding figures, or alternatively multiple inlet ports (not shown) can be substituted. The insulator port 66" is coupled to the manifold 36' of the conversion venturi 22" through a connecting conduit 117. In the event that the flow of combustion air to the conversion venturi 22" is unduly restricted by passage through the manifold insulator 48", auxiliary combustion air can be supplied to the venturi manifold 36' through conduit 118 the free end of which is exposed to the ambient after the manner of the conduit 38 (FIGS. 2 and 3). Such conduits 38, 118 can be provided with air filters 120, 120' respectively. Desirably the auxiliary combustion air conduit 118 (FIG. 7) is provided with a flow restricting orifice 122 or the like such that at least a substantial proportion of the combustion air is drawn through the variable manifold insulator 48". The conversion and variable insulator venturi 22" preferably is located, as described above, adjacent the manifold outlet port 20".

Figure 8:
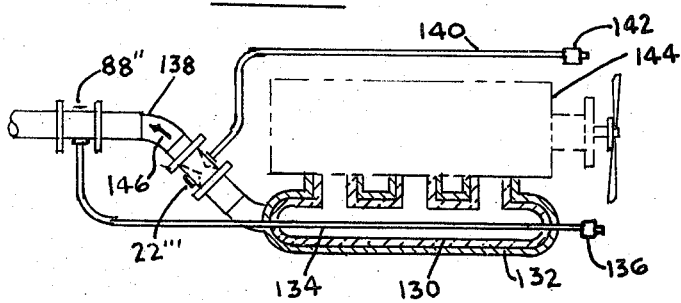
FIG. 8 is a top plan view, partly in section, of a further modification of the exhaust conversion system.

As shown in FIG. 8 the passage means of the insulated manifold arrangement may take other forms. In this arrangement engine manifold 130 is covered substantially completely with a closely fitted insulating jacket 132, which can be formed as described above except no insulating space remains between the manifold 130 and the insulator 132.

Passage means for the variable insulator arrangement are formed by moderating conduit 134 extended longitudinally and desirably spacedly through the manifold 130, which, together with the insulator 132, is provided with openings at its end for this purpose. Where additional heat exchange surface is needed two or more such conduits can be passed through the manifold 130. The forward end of the tempering conduit or passage means 134 (which can be furnished with filter 136, if necessary) is conveniently extended to the ambient, which can be the slip stream of an associated vehicle (not shown), as in FIG. 1A. The rear end portion of the conduit 134 in this example is extended to a suction venturi 88" located in the exhaust duct 138 downstream of the exhaust conversion venturi 22''', which is similarly coupled to ambient in this example through conduit 140, to which air filter 142 can be added, if necessary.

At idling speeds of the engine 144, little or no air is drawn through the tempering conduit 134, such that the exhaust gases (arrow 146) remain at a considerably higher temperature owing to the manifold insulator 132. As engine speed increases, progressively more air is drawn through the conduit 134 by the suction venturi 88" to prevent overheating of the manifold 130 by direct cooling of the exhaust gases therein. The variable insulating arrangement 132–134 otherwise functions after the manner of FIGS. 1 and 2.

It will be appreciated that the forward end portion of the manifold conduit or tempering passage means 134 can be provided with an airscoop after the manner of FIG. 1A or can be coupled to an engine-driven pump or blower (FIG. 1B). Alternatively, the rear end portion of the conduit 134 can be coupled to the conversion venturi 22'41 for preheating of combustion air after the manner of FIG. 7.

In the operation of the exhaust conversion 10" (referring to FIG. 7), it will be assumed first that the engine 16" is operating at very low rpm, e.g. at idling speed. Under these conditions the rate of flow of exhaust gases through the exhaust duct 24" (arrow 114) is at or near its slowest rate. Thus, a comparably small quantity of combustion air or other reactant is inducted into the venturi 22". The passage of this air through the variable insulating space 56" is of such low velocity that the insulating capability of the variable insulator 48" is not significantly impaired. Accordingly, the temperature of the exhaust manifold 12" increases considerably. By the same token the temperature of the combustion air inducted through the variable manifold insulator 48" is likewise increased considerably, owing to its comparatively small rate of flow, and assumes virtually the temperature of the outer surface of the exhaust manifold 12".

In consequence both the exhaust gases and the combustion air therefor are in effect preheated to elevated temperatures before entering the conversion venturi 22". Such preheating of both the exhaust gases and the reactant therefor doubly enhances the efficiency of the conversion unit 22". A first unexpected result of the exhaust conversion system 10" is that the exhaust gases are in effect preheated relative to the conversion unit or venturi 22", and a second unexpected result is that the combustion air therefor is preheated also. As the rpm of the engine 16" increases the temperature of the manifold 12" is unexpectedly lowered, to obviate manifold overheating, as additional tempering and combustion air is drawn thereover through the insulating space 56" and the connecting conduit 116 by the conversion venturi 22". In consequence the temperature of both the exhaust gases and the combustion air are unexpectedly lowered as the rate of flow of the exhaust gases increases. With the induction of larger quantities of tempering and combustion air, as the speed of the engine 16" increases, the mixing action of the conversion venturi 22", however, becomes more efficient.

Alternatively the increased flow of tempering air through the variable insulator 48" can be predetermined, by suitably dimensioning the insulating space 56" and the inlet and outlet insulator ports 60''', 66" such that the outer surface temperature of the manifold 12" remains more or less constant irrespective of engine speed. However, as engine rpm increases, the preheat temperature of the combustion air may decrease somewhat as the efficiency of the heat exchange with the outer surface of the manifold 12" will decrease with increased rates of flow of the tempering and combustion air. In any event the flow of tempering air through the space 56" is selected to prevent overheating of the manifold 12" at the higher engine rpms. A degree of effective preheating of both the combustion air and of the exhaust gases can therefore be provided by the exhaust conversion system 10" irrespective of engine rpm.

The several embodiments of the exhaust conversion system, according to the preceding FIGS. 1–6 and 8, operate in an essentially similar manner, with the exceptions that the combustion air is not preheated and that means essentially independent of the conversion venturi 22 are provided for forcing tempering air through the variable insulator passage means 56.

From the foregoing it will be apparent that novel and efficient forms of Anti-Pollution Exhaust Conversion Systems have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. An anti-pollution exhaust conversion system for an exhaust duct through which partially reacted exhaust gases are circulated, said system comprising induction and mixing means mounted in said exhaust duct for inducting and mixing a reactant fluid with said exhaust gases, a collector coupled to said exhaust duct and to a source of said gases, a variable insulator substantially surrounding said collector, said variable insulator having passage means extending therethrough for passage of a tempering fluid for varying the insulating characteristic of said variable insulator, means for supplying a reactant fluid to said induction and mixing means for induction thereby into said exhaust duct, means for varying the rate of flow of said tempering fluid through said variable insulator passage means, said tempering fluid varying means including means for coupling said insulator passage means to said induction and mixing means so that the flow of tempering fluid through said passage means is varied directly with the rate of flow of said exhaust gases through said exhaust duct, said source being an internal combustion engine having at least two banks of cylinders and an exhaust collector for each bank of said cylinders, each of said collectors being so provided with similar variable insulators each having tempering passage means, said induction and mixing means including a venturi member mounted adjacent the outlet of each of said collectors for inducting said reactant fluid into said exhaust system, exhaust conduit means coupling the outlets of each of said venturi members to said exhaust duct, said induction and mixing means further including an additional venturi member mounted in said exhaust duct downstream of the connection thereof to said exhaust conduit means, and suction conduit means coupling said additional venturi member to the tempering passage means of said variable insulators.

2. An anti-pollution exhaust conversion system for an exhaust duct through which partially reacted exhaust gases are circulated, said system comprising induction and mixing means mounted in said exhaust duct for inducting and mixing a reactant fluid with said exhaust gases, a collector coupled to said exhaust duct and to a source of said gases, a variable insulator substantially surrounding said collector, said variable insulator having passage means extending therethrough for passage of a tempering fluid for varying the insulating characteristic of said variable insulator, means for supplying a reactant fluid to said induction and mixing means for induction thereby into said exhaust duct, means for varying the rate of flow of said tempering fluid through said variable insulator passage means, said variable insulator being closely fitted about said collector, and said passage means including at least one heat exchanging conduit extended through said collector.

3. An anti-pollution exhaust conversion system for an exhaust duct through which partially reacted exhaust gases are circulated, said system comprising induction and mixing means mounted in said exhaust duct for inducting and mixing a reactant fluid with said exhaust gases, a collector coupled to said exhaust duct and to a source of said gases, a variable insulator substantially surrounding said collector, said variable insulator having passage means extending therethrough for passage of a tempering fluid for varying the insulating characteristic of said variable insulator, means for supplying a reactant fluid to said inducting and mixing means for induction thereby into said exhaust duct, and means for varying the rate of flow of said tempering fluid through said variable insulator passage means, said variable insulator including a porous insulating material closely fitted about said collector and confined thereagainst by an impervious backing member, the porosity of said insulating material forming said passage means therethrough.

* * * * *